United States Patent
Posamentier

(10) Patent No.: US 7,397,782 B2
(45) Date of Patent: Jul. 8, 2008

(54) DIRECTIONAL TRANSMISSIONS TO MULTIPLE WIRELESS DEVICES

(75) Inventor: Joshua Posamentier, Oakland, CA (US)

(73) Assignee: Intel Corporation, Santa Clara, CA (US)

( * ) Notice: Subject to any disclaimer, the term of this patent is extended or adjusted under 35 U.S.C. 154(b) by 448 days.

(21) Appl. No.: 11/134,214

(22) Filed: May 19, 2005

(65) Prior Publication Data
US 2006/0262747 A1     Nov. 23, 2006

(51) Int. Cl.
*H04Q 7/20*     (2006.01)
(52) U.S. Cl. ................ 370/338; 370/328; 370/329; 455/456.1
(58) Field of Classification Search ........... 455/403, 455/404.1, 404.2, 500, 422.1, 550.1, 560, 455/561, 562.1, 426.1, 39, 73, 456.1, 456.2, 455/456.3; 370/310, 328, 329, 335
See application file for complete search history.

(56) References Cited

U.S. PATENT DOCUMENTS 6,061,337 A * 5/2000 Light et al. ............ 370/331
6,169,476 B1 * 1/2001 Flanagan ............ 340/286.02
2002/0011174 A1   8/2002 Judson et al.
2003/0199269 A1 * 10/2003 Tobe et al. ............ 455/422.1

FOREIGN PATENT DOCUMENTS

EP     1 335 618     8/2003

OTHER PUBLICATIONS

PCT/US2006/019870—International Search Report Mailed Oct. 12, 2006.

* cited by examiner

*Primary Examiner*—Jean A Gelin
(74) *Attorney, Agent, or Firm*—John F. Travis

(57) ABSTRACT

A wireless communications device receives information about the locations of other wireless communications devices from those other wireless communications devices, uses the location information to determine what directions those other wireless communications devices are from it, and creates a directional transmission to focus the transmission in the direction of one or more of those other wireless communications devices.

12 Claims, 3 Drawing Sheets

DIRECTIONAL TRANSMISSIONS TO MULTIPLE WIRELESS DEVICES

BACKGROUND

In a typical system involving wireless communications devices, a central wireless device (e.g., a base station, access point, etc.) may communicate directly with multiple mobile wireless devices (e.g., cell phones, wireless computers, personal data assistants, etc.). Because the mobile wireless devices may be located in any direction from the central wireless device, the central wireless device may transmit signals in a substantially omnidirectional or sectorized manner, so that the mobile wireless devices may be able to receive the signals regardless of which direction they are from the central wireless device. However, much of the transmission is directed to locations in which no mobile devices are located. This may result in radio frequency and bandwidth utilization inefficiencies.

BRIEF DESCRIPTION OF THE DRAWINGS

The invention may be understood by referring to the following description and accompanying drawings that are used to illustrate embodiments of the invention. In the drawings.

DETAILED DESCRIPTION

Figure 1:
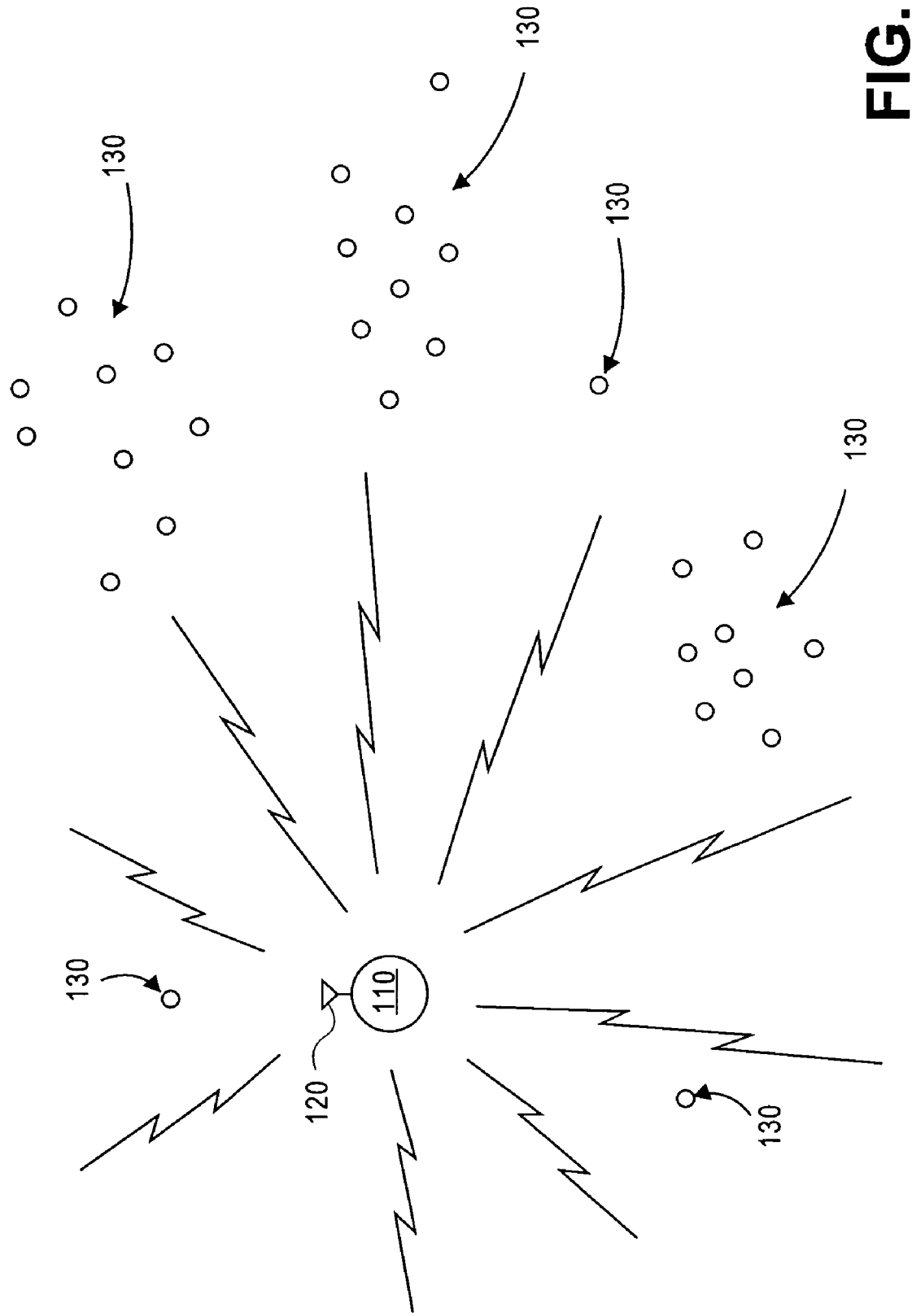
FIG. 1 shows a network of wireless devices, according to an embodiment of the invention.

In the following description, numerous specific details are set forth. However, it is understood that embodiments of the invention may be practiced without these specific details. In other instances, well-known circuits, structures and techniques have not been shown in detail in order not to obscure an understanding of this description.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements co-operate or interact with each other, but they may or may not be in direct physical or electrical contact.

The term "processor" may refer to any device or portion of a device that processes electronic data from registers and/or memory to transform that electronic data into other electronic data that may be stored in registers and/or memory. A "computing platform" may comprise one or more processors.

The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The term "mobile wireless device" may be used to describe a wireless device that may be moved while it is communicating.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Various embodiments of the invention may be implemented in one or a combination of hardware, firmware, and software. The invention may also be implemented as instructions contained on a machine-readable medium, which may be read and executed by a computing platform to perform the operations described herein. A machine-readable medium may include any mechanism for storing, transmitting, or receiving information in a form readable by a machine (e.g., a computer). For example, a machine-readable medium may include read only memory (ROM); random access memory (RAM); magnetic disk storage media; optical storage media; flash memory devices; electrical, optical, acoustical or other form of propagated signals (e.g., carrier waves, infrared signals, digital signals, etc.), the interfaces and/or antennas that transmit and/or receive those signals; and others.

Some embodiments of the invention may use power steering antennas, phased arrays, and/or other techniques to deliver a directional transmitted signal to mobile wireless devices, i.e., a transmitted signal that is stronger in one or more particular directions than in other directions. A directional beam may be directed to a single wireless mobile device or to a group of wireless mobile devices. These direction(s) may be based on the wireless mobile devices' own knowledge of their location(s), which may be communicated to the transmitting device so that the preferred direction(s) of transmission may be determined. This method of gathering the location information from the content of messages received from the mobile wireless devices themselves differs from some other techniques, techniques which may involve directly determining the direction of the signals received from the mobile wireless devices regardless of the content of the received message.

FIG. 1 shows a network of wireless devices, according to an embodiment of the invention. In the illustrated embodiment, a central wireless device 110 may communicate with individual mobile wireless devices 130, which are shown scattered about the central wireless device 110 in a somewhat random manner. The central wireless device 110 may have one or more antennas 120 to transmit signals to, and receive signals from, various ones of mobile wireless devices 130. The mobile wireless devices may also each have one or more antennas for communicating with the central wireless device 110, antennas which are not shown for the sake of clarity in the drawing. In some embodiments the central wireless device 110 may be any of various types of wireless devices that are able to communicate with multiple other wireless devices, such as but not limited to an access point, a base station, etc. In some embodiments the mobile wireless devices 130 may be any of various types of wireless devices, such as but not limited to cell phones, portable personal computers, personal data assistants, etc.

In some embodiments the central wireless device 110 may act as a coordinator for the network by controlling which of the mobile wireless devices 130 may communicate with it at any given time. In some embodiments each of the mobile wireless devices 130 may 'associate' itself with the central wireless device 110, by a transfer of pertinent information between the two devices, so that the central wireless device is aware of the presence of the mobile wireless device within its communications range, and may send addressed messages to, or receive addressed messages from, the associated mobile wireless device.

The central wireless device 110 is shown in FIG. 1 transmitting signals in a substantially omni-directional manner to the mobile wireless devices 130, so that the mobile wireless devices 130 may be able to receive such signals regardless of the direction of the mobile wireless device from the central wireless device 110. In some embodiments, 'substantially omni-directional' may indicate the transmission power is directed somewhat uniformly in horizontal directions—since the configuration of the earth's surface places most mobile devices in a substantially horizontal direction from the central wireless device. In some embodiments, depending on the configuration of the antenna(s), the transmission power may also be fairly uniform in 3-dimensional space. Antennas for a central wireless device 110 may include, but are not limited to, such things as 1) a single antenna, 2) multiple antennas, 3) multiple sectorized antennas (e.g., each antenna may individually be substantially directional, but the combined pattern of all the antennas may be substantially omnidirectional), 4) etc. Each of the mobile wireless devices 130 may also be able to transmit signals to the central wireless device 110 when permitted to under the protocols of the communications techniques being used.

Each mobile wireless device 130 may transmit various types of information to the central wireless device 110. Some of that information may contain location information about the mobile wireless device, i.e., information that describes, or enables the determination of, the location of the mobile wireless device with respect to some type of coordinate system. The mobile wireless device may obtain such location information about itself in any feasible manner. Some examples may include, but are not limited to, such things as: 1) a global positioning system (GPS), 2) a triangulation technique that determines the location of the mobile wireless device with respect to other objects whose positions are known via any feasible technique, such as but not limited to, time-of-arrival measurements and/or direction-of-arrival measurements, 3) inputs from a nearby location device that conveys its location to nearby mobile wireless devices, 4) etc. The degree of precision in the location information transmitted by the mobile wireless device may vary depending on numerous factors. In some embodiments the degree of such precision may be conveyed to the central wireless device, and/or may otherwise be known to the central wireless device, which in some embodiments may adjust its own calculations based on the probable error range that may result from the impression.

Figure 2:
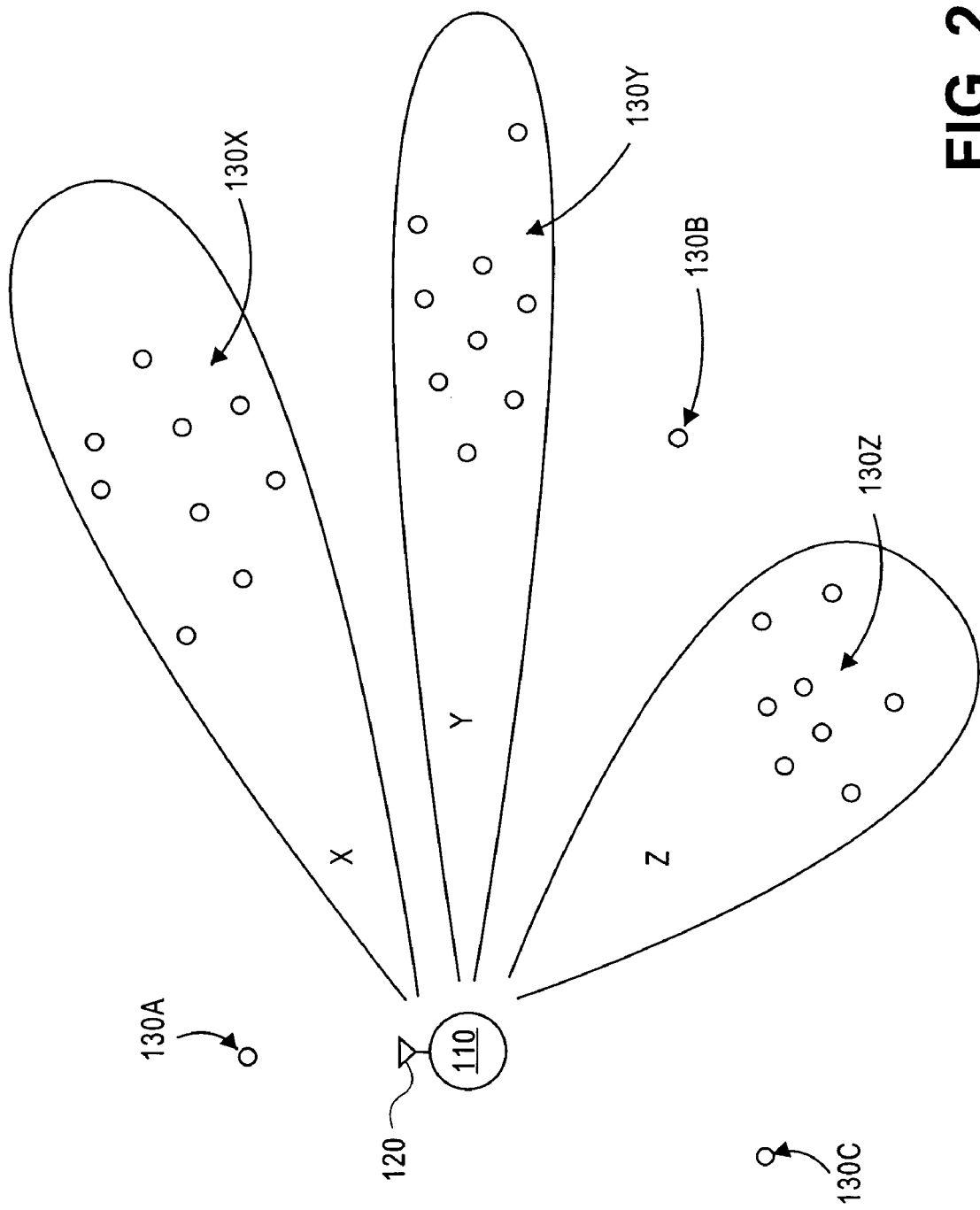
FIG. 2 shows the network of FIG. 1 divided into directional transmission zones, according to an embodiment of the invention.

FIG. 2 shows the network of FIG. 1 divided into directional transmission zones, according to an embodiment of the invention. As used herein, directional transmission zones are areas in which a directional signal transmitted from a wireless device has a range of power that is suitable for reliable reception by other wireless devices within the directional transmission zone. Various techniques may be used to create directional transmissions, i.e., transmissions that are relatively strong within a range of directions, but are relative weak in other directions. These techniques may include, but are not limited to, phased array transmissions using multiple antennas, power steering antennas, physically movable focused antennas, etc. In addition, since transmissions may tend to weaken with distance from the transmitter, a directional transmission zone may have an outer border based on distance from the transmitter as well as side borders based on angular direction from the transmitter.

In the illustrated embodiment of FIG. 2, the mobile wireless devices now labeled as 130X are clustered in a group that falls within a directional transmission zone X, which may be reached by a directional transmission from central wireless device 110 that is effective within directional transmission zone X, but which may be too weak to be reliably effective in most areas outside of directional transmission zone X. The directional transmission zone may encompass any directions that are within a range of directions from the central wireless device. In a similar manner, the mobile wireless devices now labeled as 130Y may be reached by central wireless device 110 using a directional transmission that is effective within directional transition zone Y, and the mobile wireless devices now labeled as 130Z may be reached by a directional transmission that is effective with directional transition zone Z.

Since directional transmissions may tend to gradually decline in strength as the receiving device moves away from the borders of the transmission zone, rather than the transmission abruptly disappearing at the borders, the transmission zones may be defined such that the transmission signal is adjudged to be reliably strong for receiving devices that are within the defined transmission zone, but may or may not be reliably strong for devices that are near, but outside, the borders of the transmission zone. However, the transition zone may be made to appear as having sharply defined borders by selective use of destination addresses in the transmissions. The central wireless device may address its communications only to those devices that are determined to be within a defined transmission zone, so that devices outside that zone may not be addressed, even if they are sensitive enough to receive the signal. The allowable error in the reported locations of the mobile wireless devices may be taken into account when defining the transmission zones.

Mobile wireless devices 130A, B and C are shown as relatively isolated from the previously-mentioned mobile wireless devices, so that they do not fall within the directional transmission zones X, Y, or Z. Transmissions from the central wireless device 110 to these mobile wireless devices 130A, B, C, which may be located individually and/or in small groupings, may be handled in various ways, such as but not limited to: 1) create directional transmission zones to include one or a small cluster of such isolated mobile wireless devices, 2) transmit to such isolated mobile wireless devices using an omni-directional signal, 3) expand the size of other directional transmission zones to include the isolated mobile wireless devices, 4) any combination of one or more of these techniques.

A directional transmission zone may therefore be defined based on various criteria. Based on location information received from various mobile wireless devices that have established communications with a central wireless device, the central wireless device may create directional transmission zones that each encompass a group of the mobile wireless devices that appear to be clustered together within a range of directions. The extent of this range of directions may be based on any of multiple factors, including but not limited to any one or more of: 1) the maximum or minimum width that a directional transmission can feasibly have, 2) the maximum or minimum number of mobile wireless devices that the central wireless device prefers to include within a directional transmission zone, 3) the maximum or minimum number of directional transmission zones that the central wireless device prefers to create, 4) the clustering of the mobile wireless devices, 5) any combination of such factors, 6) etc.

Figure 3:
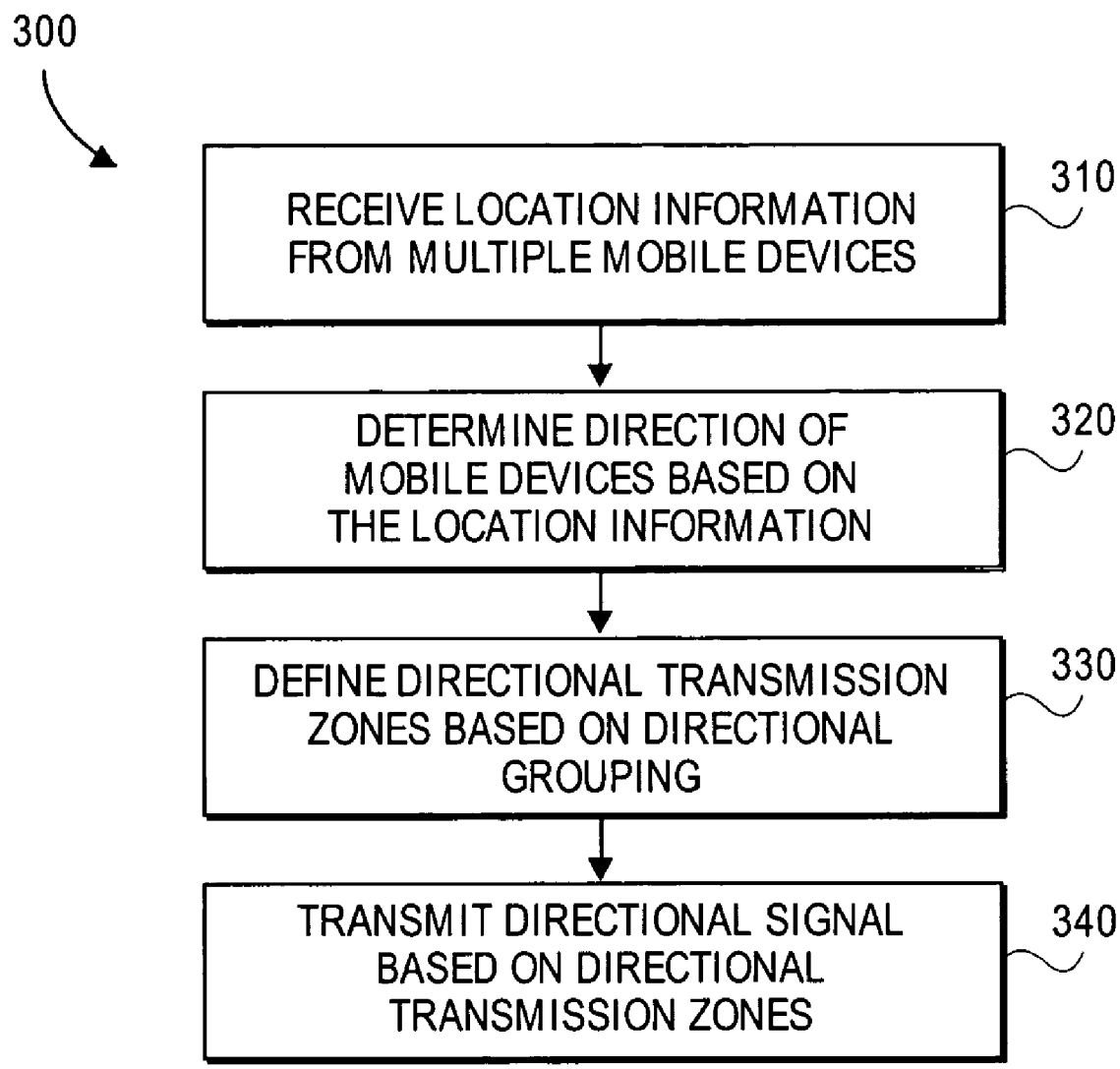
FIG. 3 shows a flow diagram of a method, according to an embodiment of the invention.

FIG. 3 shows a flow diagram of a method, according to an embodiment of the invention. In the illustrated flow diagram 300, at 310 a central wireless device may receive information from each of multiple mobile wireless devices concerning the location of that mobile wireless device. The location information may have been determined by each of the mobile wireless devices in any feasible manner, such as but not limited to: 1) use of a global positioning system, 2) triangulation based on earth-bound devices, 3) input of the location information from another device external to the mobile wireless device, 4) etc. The location information may be based on any feasible coordinate system, such as but not limited to 1) a grid coordinate system, 2) a spherical coordinate system (e.g., latitude/longitude and/or elevation), 3) etc.

At 320, the direction of each mobile wireless device from the central wireless device may be determined, based on the received location information. In some embodiments, the central mobile device may contain location information on its own location, and may use that in combination with the location information for a particular mobile wireless device to determine the direction to the particular mobile wireless device. The location information on the mobile wireless device and the central wireless device may use the same coordinate system or be converted to the same or compatible coordinate systems for the determination of direction.

After determining the directions of multiple mobile wireless devices from the central wireless device, at 330 one or more directional transmission zones may be determined such that multiple ones of the mobile wireless devices may be located within each of the directional transmission zones. In some implementations, an analysis of the directions may reveal a cluster of mobile wireless devices that are in the same general direction, and the directional transmission zone may be defined to encompass the mobile wireless devices within that cluster. In some embodiments, the angular width of the directional transmission zone may vary depending on various factors (e.g., the size of the cluster, the limits of the directional transmitting techniques, etc.), but other embodiments may create a directional transmission zone with a fixed angular width. Multiple such directional transmission zones may be defined to encompass multiple groups of the mobile wireless devices. In some embodiments, some of the directional transmission zones may overlap each other.

At 340, the central wireless device may transmit directional signals to each directional transmission zone, with such signals including communications directed to one or more of the mobile wireless devices within that directional transmission zone. The various directional transmission zones may be redefined as needed as often as is feasible, based on various factors such as but not limited to: 1) the addition or subtraction of mobile wireless devices from the network, 2) movement of some or all of the mobile wireless devices in the network, 3) movement of the central wireless device, 4) change in environmental factors within the network, 5) etc.

The foregoing description is intended to be illustrative and not limiting. Variations will occur to those of skill in the art. Those variations are intended to be included in the various embodiments of the invention, which are limited only by the spirit and scope of the following claims.

What is claimed is:

1. A system, comprising:
a first wireless device to:
communicate with multiple mobile wireless devices;
obtain location information from the multiple mobile wireless devices about locations of the multiple mobile wireless devices;
determine, based on the location information, a direction of each of the mobile wireless devices from the first wireless device;
determine a range of directions that encompasses the directions of a group of the mobile wireless devices; and
transmit a directional signal that encompasses the range of directions;
wherein said obtaining the location information is not based on measuring directions from which the signals from the mobile wireless devices are received.

2. The system of claim 1, wherein the first wireless device is configured to use a phased array antenna technique.

3. The system of claim 1, wherein the first wireless device is configured to use a power steering antenna technique.

4. The system of claim 1, wherein the first wireless device is further configured to convert the location information into locations relative to its own location.

5. The system of claim 1, wherein the first wireless device is further configured to use the information about the directions to determine which mobile wireless devices are to be in the group.

6. A method, comprising:
receiving location information from multiple mobile wireless devices about locations of the multiple mobile wireless devices;
determining, from the location information, a relative direction to each of the mobile wireless devices;
grouping the relative directions into a group of relative directions that are within a range of relative directions; and
transmitting a directional signal that encompasses the group of relative directions at one time.

7. The system of claim 1, further comprising at least one antenna coupled to the first wireless device.

8. The method of claim 6, wherein said transmitting a directional signal comprises transmitting using a phased array technique.

9. The method of claim 6, wherein said receiving comprises receiving the location information based on a grid coordinate system.

10. The method of claim 6, wherein said receiving comprises receiving the location information based on a global positioning system.

11. A machine-readable medium that provides instructions, which when executed by a computing platform, result in at least one machine performing operations comprising:
receiving location information from multiple mobile wireless devices about locations of the multiple mobile wireless device;
determining, from the location information, a relative direction to each of the mobile wireless devices;
grouping the relative directions into a group of relative directions that are within a group of relative directions; and
transmitting a directional signal to encompass the group of relative directions at one time.

12. The article of claim 11, wherein said receiving comprises receiving the location information based on a grid coordinate system.

* * * * *